United States Patent
Kotake et al.

(10) Patent No.: US 10,241,216 B2
(45) Date of Patent: Mar. 26, 2019

(54) RADIATION IMAGE DETECTION PANEL AND RADIATION DETECTION DEVICE

(71) Applicant: Konica Minolta, Inc., Tokyo (JP)

(72) Inventors: Haruka Kotake, Hino (JP); Temmei Ito, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/976,310

(22) Filed: May 10, 2018

(65) Prior Publication Data

US 2019/0004186 A1 Jan. 3, 2019

(30) Foreign Application Priority Data

Jun. 28, 2017 (JP) .................. 2017-126179

(51) Int. Cl.
*G01T 1/20* (2006.01)
*G01T 1/202* (2006.01)

(52) U.S. Cl.
CPC ............ *G01T 1/2002* (2013.01); *G01T 1/202* (2013.01); *G01T 1/2018* (2013.01)

(58) Field of Classification Search
CPC ...... G01T 1/2002; G01T 1/2018; G01T 1/202
See application file for complete search history.

(56) References Cited

U.S. PATENT DOCUMENTS

| | | | | |
|---|---|---|---|---|
| 4,044,332 A | * | 8/1977 | Grenier | G01T 1/1644 250/369 |
| 2011/0121185 A1 | * | 5/2011 | Hirai | G01T 1/202 250/361 R |
| 2013/0161522 A1 | * | 6/2013 | Ishida | G01T 1/20 250/366 |
| 2015/0021484 A1 | * | 1/2015 | Isa | G01T 1/202 250/361 R |
| 2016/0372611 A1 | * | 12/2016 | Isoda | H01L 31/024 |
| 2017/0160405 A1 | * | 6/2017 | Kim | G01T 1/2018 |

FOREIGN PATENT DOCUMENTS

| JP | 2012200373 A | 10/2012 |
|---|---|---|
| JP | 2015230175 A | 12/2015 |

* cited by examiner

*Primary Examiner* — Marcus H Taningco
(74) *Attorney, Agent, or Firm* — Lucas & Mercanti, LLP

(57) ABSTRACT

A radiation image detection panel includes: a scintillator layer formed of columnar crystals; an optical coupling layer; and a planar light receiving element, wherein a material constituting the optical coupling layer has a storage elastic modulus of $1 \times 10^7$ Pa or more at 0 to 40° C.

9 Claims, 1 Drawing Sheet

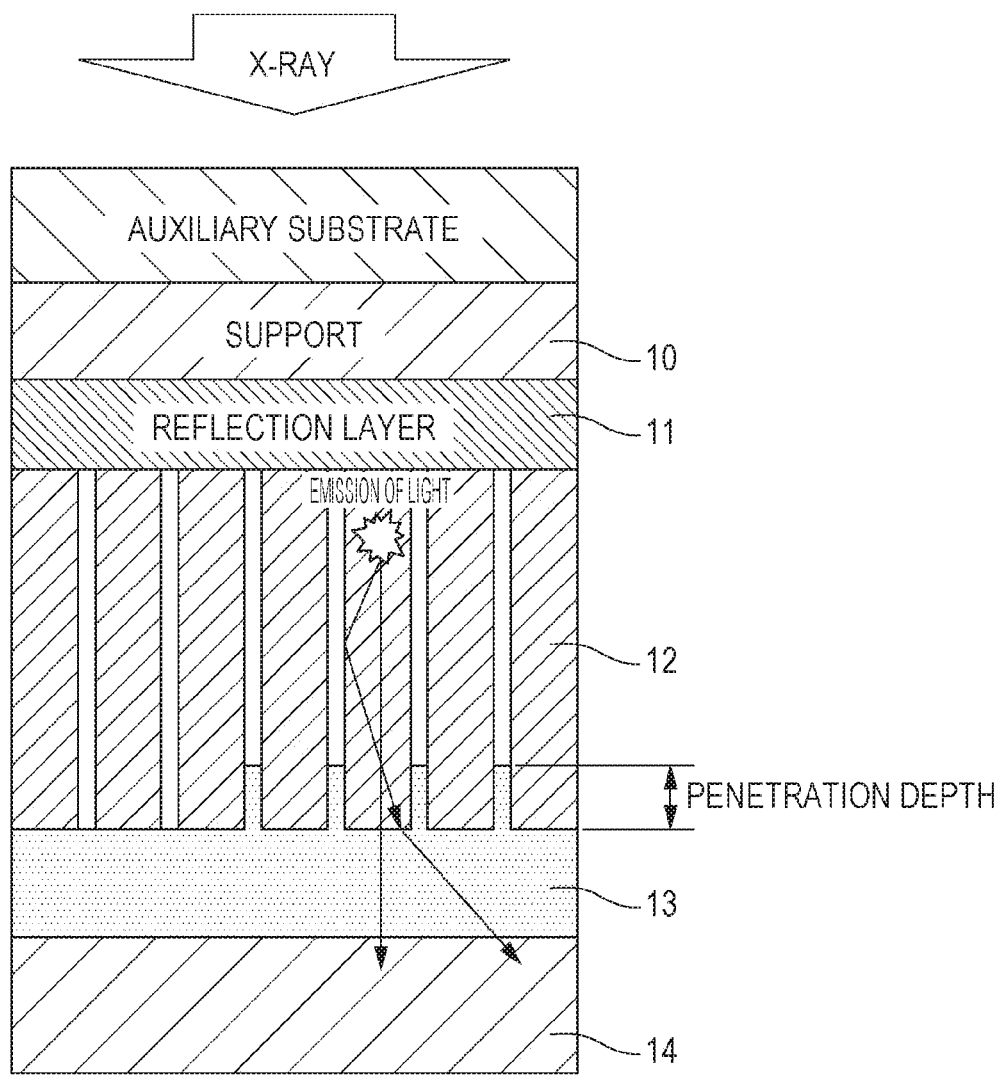

RADIATION IMAGE DETECTION PANEL AND RADIATION DETECTION DEVICE

The entire disclosure of Japanese patent Application No. 2017-126179, filed on Jun. 28, 2017, is incorporated herein by reference in its entirety.

BACKGROUND

Technological Field

The present invention relates to a radiation image detection panel having high sharpness and beings stable against temperature change of outside air.

Description of the Related Art

In recent years, a digital radiation image detection device typified by a computed radiography (CR), a flat panel detector (FPD), or the like has appeared. These devices can directly obtain a digital radiation image and can directly display an image on an image display device such as a cathode tube or a liquid crystal panel. As a result, convenience of diagnostic work at a hospital, a clinic, or the like has been largely improved.

As a new digital radiation image technology, a flat panel detector (FPD) using a thin-film transistor (TFT) or a charge-coupled device (CCD) has been developed.

Concerning these radiation image detection devices, a radiation image detection device including an imaging panel obtained by bonding a sensor panel (planar light receiving element) in which light receiving elements such as thin-film transistors (TFT) and charge-coupled devices (CCD) are two-dimensionally arranged to a scintillator panel in which a scintillator layer for converting radiation into light that can be detected by the light receiving elements is formed on a support is known.

In a general scintillator panel, a protective layer (parylene or the like) is disposed on a scintillator, and an adhesive layer to a sensor and the scintillator are not in direct contact with each other (JP 2012-200373 A).

However, it is known that sharpness is lowered by scattering of light through the protective layer. The adhesive layer and the scintillator are desirably in direct contact with each other by eliminating the protective layer for improving characteristics and reducing cost.

JP 2015-230175 A discloses a radiation image detection device formed by a scintillator panel, an adhesive, and a planar light receiving element. The adhesive is constituted by a layer mainly containing one or more kinds of hot-melt resins. Furthermore, JP 2015-230175 A discloses that the penetration depth of the adhesive between columnar crystals of a phosphor is preferably 1 to 50 μm, and more preferably 5 to 30 μm. As the hot-melt resin, a polyolefin-based resin is used.

Furthermore, JP 2012-200373 A discloses a radiation imaging device obtained by bonding a sensor panel to a scintillator panel with an adhesive layer. JP 2012-200373 A discloses that the adhesive layer is a pressure-sensitive adhesive sheet and has a thickness of 15 to 50 μm.

Like these devices, a product in which an optical coupling layer such as an adhesive layer is directly disposed on columnar crystals may cause image unevenness or peeling due to temperature fluctuation in a use environment or a transportation environment. The present inventors consider that the image unevenness or peeling occurs because the optical coupling layer penetrating between the columnar crystals is deformed due to environmental temperature fluctuation.

SUMMARY

An object of the present invention is to achieve both improvement of sharpness and suppression of image unevenness due to peeling or deformation of an optical coupling layer by temperature change of outside air in a form in which a scintillator and the optical coupling layer are in direct contact with each other by controlling deformation of a thermoplastic resin in a temperature range in a use environment or a transportation environment.

To achieve the abovementioned object, according to an aspect of the present invention, a radiation image detection panel reflecting one aspect of the present invention comprises: a scintillator layer formed of columnar crystals; an optical coupling layer; and a planar light receiving element, wherein a material constituting the optical coupling layer has a storage elastic modulus of $1 \times 10^7$ Pa or more at 0 to 40° C.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 1 is a schematic cross-sectional view illustrating the configuration of a radiation image detection device according to an embodiment of the present invention.

DETAILED DESCRIPTION OF EMBODIMENTS

Hereinafter, one or more embodiments of the present invention will be described with reference to the drawings. However, the scope of the invention is not limited to the disclosed embodiments.

A radiation image detection panel according to an embodiment of the present invention includes a scintillator layer formed of columnar crystals, an optical coupling layer, and a planar light receiving element, and is characterized in that the scintillator layer is in direct contact with the optical coupling layer and that a thermoplastic resin constituting the optical coupling layer has a storage elastic modulus of $1 \times 10^7$ Pa or more at 0° C. to 40° C.

FIG. 1 illustrates a schematic sectional view of the configuration of the radiation image detection panel. In FIG. 1, reference numeral 10 denotes a support, reference numeral 11 denotes a reflection layer, reference numeral 12 denotes a scintillator layer, reference numeral 13 denotes an optical coupling layer, and reference numeral 14 denotes a planar light receiving element. Incidentally, the support and the reflection layer are not necessarily indispensable and are not needed to be disposed. Furthermore, the configuration of the radiation image detection panel is not particularly limited except that each of the scintillator layer, the optical coupling layer, and the planar light receiving element has a predetermined configuration according to an embodiment of the present invention, and an auxiliary substrate and the like in FIG. 1 may be appropriately disposed.

Scintillator Layer 12

The scintillator layer contains columnar crystals as a phosphor, and the columnar crystals have a columnar diameter usually of 2 to 20 µm, preferably of 3 to 15 µm. The scintillator layer has a film thickness usually of 100 to 1,000 µm, preferably of 100 to 600 µm, more preferably of 200 to 600 µm.

The scintillator layer has a packing ratio usually of 70 to 90%, preferably of 72 to 88%, more preferably of 75 to 85%. Note that the "packing ratio" means a value obtained by dividing the actual mass of the scintillator layer by a theoretical density thereof and an apparent volume thereof.

The scintillator layer has a role of converting energy of an X-ray as radiation incident from an outside into visible light. The scintillator layer refers to a phosphor that emits light by excitation of atoms at the time of irradiation with ionizing radiation such as an α-ray, a γ-ray, or an X-ray. That is, the scintillator layer refers to a phosphor that converts radiation into ultraviolet and visible light and releases the light. The phosphor constituting the scintillator layer is not particularly limited as long as being a material capable of efficiently converting radiation energy such as an X-ray incident from an outside into light. In addition, the conversion of radiation into light is not necessarily instantaneous. A method for temporarily storing the radiation as a latent image in a phosphor layer and reading the latent image later may be used.

For example, as a phosphor according to an embodiment of the present invention, it is possible to appropriately use a substance that can convert radiation such as an X-ray into light having a different wavelength, such as visible light. Specifically, a scintillator and a phosphor described at pp. 284 to 299 of "Phosphor Handbook" (edited by Phosphor Research Society, Ohmsha, Ltd., 1987) and a substance described in "Scintillation Properties (http://scintillator.l-bl.gov/)" (Web homepage of U.S. Lawrence Berkeley National Laboratory) can be used. However, even a substance not described here can be used as a phosphor particle as long as the substance "can convert radiation such as an X-ray into light having a different wavelength, such as visible light".

Specific examples of the composition of the phosphor include the following.

First, a metal halide-based phosphor represented by basic composition formula (I):

$$M^I X \cdot aM^{II} X'_2 \cdot bM^{III} X''_3 : zA$$

is exemplified.

In the above formula, $M^I$ represents an element that can become a monovalent cation, that is, at least one selected from the group consisting of lithium (Li), sodium (Na), potassium (K), rubidium (Rb), cesium (Cs), thallium (Tl), silver (Ag), and the like.

$M^{II}$ represents an element that can become a divalent cation, that is, at least one selected from the group consisting of beryllium (Be), magnesium (Mg), calcium (Ca), strontium (Sr), barium (Ba), nickel (Ni), copper (Cu), zinc (Zn), cadmium (Cd), and the like.

$M^{III}$ represents at least one selected from the group consisting of scandium (Sc), yttrium (Y), aluminum (Al), gallium (Ga), indium (In), and elements belonging to lanthanoid.

X, X', and X" each represent a halogen element, and may represent different elements or the same element.

A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth).

a, b, and z independently represent numerical values within ranges of 0≤a<0.5, 0≤b<0.5, and 0<z<1.0, respectively.

In addition, a rare earth activated metal fluorohalide-based phosphor represented by basic composition formula (II):

$$M^{II}FX:zLn$$

is also exemplified.

In the above formula, $M^{II}$ represents at least one alkaline earth metal element, Ln represents at least one element belonging to lanthanoid, and X represents at least one halogen element. z satisfies 0<z≤0.2.

In addition, a rare earth oxysulfide-based phosphor represented by basic composition formula (III):

$$Ln_2O_2S:zA$$

is also exemplified.

In the above formula, Ln represents at least one element belonging to lanthanoid, and A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth). z satisfies 0<z<1.

Particularly, $Gd_2O_2S$ using gadolinium (Gd) as Ln is particularly preferable because it is known that by using terbium (Tb), dysprosium (Dy), or the like as an element of A, $Gd_2O_2S$ exhibits high luminous characteristics in a wavelength region in which a light receiving element receives light most easily.

In addition, a metal sulfide-based phosphor represented by basic composition formula (IV):

$$M^{II}S:zA$$

is also exemplified.

In the above formula, $M^{II}$ represents an element that can become a divalent cation, that is, at least one element selected from the group consisting of an alkaline earth metal, zinc (Zn), strontium (Sr), gallium (Ga), and the like, and A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth). z satisfies 0<z<1.

In addition, a metal oxoacid salt-based phosphor represented by basic composition formula (V):

$$M_a(AG)_b:zA$$

is also exemplified.

In the above formula, M represents a metal element that can become a cation, (AG) represents at least one oxo acid group selected from the group consisting of a phosphate, a borate, a silicate, a sulfate, a tungstate, and an aluminate, and A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth).

In addition, each of a and b represents any value that can be according to a valence of a metal or an oxo acid group. z satisfies 0<z<1.

In addition, a metal oxide based phosphor represented by basic composition formula (VI):

$$M_aO_b:zA$$

is also exemplified.

In the above formula, M represents a metal element that can become a cation and represents at least one element selected from the above examples of $M^I$ and $M^{II}$.

In addition, each of a and b represents any value that can be according to a valence of a metal or an oxo acid group. z satisfies 0<z<1.

In addition, a metal acid halide-based phosphor represented by basic composition formula (VII):

LnOX:zA is also exemplified.

In the above formula, Ln represents at least one element belonging to lanthanoid, X represents a halogen, and A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth). z satisfies $0<z<1$.

In the present invention, the scintillator layer is usually formed of columnar crystals including the phosphor. The columnar crystals are usually formed by a vapor phase deposition method, and examples of the forming method include a heating vapor deposition method, a sputtering method, a CVD method, and an ion plating method. Particularly, the heating vapor deposition method is desirable.

Examples of a phosphor material forming the scintillator layer include, in addition to terbium-activated gadolinium sulfate ($Gd_2O_2S(Tb)$) and silver-activated zinc sulfide (ZnS (Ag)), a material obtained by adding at least one activator selected from indium, thallium (Tl), lithium (Li), potassium (K), rubidium (Rb), and sodium (Na) to cesium iodide (CsI). Among these materials, a material obtained by adding at least one activator to cesium iodide (CsI) is preferable.

Specifically, sodium-activated cesium iodide (CsI(Na)), thallium-activated cesium iodide (CsI(Tl)), and the like are preferable because (CsI(Na)), (CsI(Tl)), and the like have high radiation absorption and high luminous efficiency and can obtain a high-quality image with low noise. Thallium-activated cesium iodide (CsI(Tl)) is more preferable because (CsI(Tl)) has a wide emission wavelength range of 300 to 750 nm to make a change ratio from an X-ray to visible light relatively high, easily forms columnar crystals by vapor deposition, suppresses scattering of emitted light in the crystals due to a light guide effect caused by a crystal structure, and can thereby increase the thickness of the scintillator layer.

Note that a method for forming the scintillator layer is disclosed in JP 2016-172928 A, JP 2016-136094 A, JP 2016-132715 A, JP 2016-095189 A, JP 2016-090388 A, JP 2016-088989 A, JP 2016-085194 A, JP 2016-085165 A, JP 2014-48225 A, and the like.

Support 10

The configuration of the scintillator panel is not particularly limited as long as including the scintillator layer and may include a scintillator support. The support is used as a base for a phosphor forming the scintillator layer and has a role of maintaining the structure of the scintillator layer. Note that the support is not always necessary.

Examples of a material of the support include a film, a sheet, and a plate formed of various kinds of glass, a polymer, and a metal capable of transmitting radiation such as an X-ray. Specific examples of the raw material of the support include plate glass such as quartz, borosilicate glass, or chemically reinforced glass; an amorphous carbon plate; a plate-shaped ceramic such as sapphire, silicon nitride, or silicon carbide; a semiconductor obtained by molding silicon, germanium, gallium arsenide, gallium phosphide, gallium nitride, or the like into a plate shape; a polymer sheet (plastic sheet) such as a polymer film (plastic film) including a cellulose acetate film, a polyester resin film, a polyethylene terephthalate film, a polyimide film, a polyimide film, a triacetate film, and a polycarbonate film, or a carbon fiber-reinforced resin sheet; a metal sheet such as an aluminum sheet, an iron sheet, a copper sheet, or a lead plate, or a metal sheet having a cover layer of an oxide of the metal; and a bionanofiber film. The support may be formed of one layer of the above raw material or may be formed of two or more layers of the above raw materials of the same kind or different kinds.

Among these raw materials, the support is preferably formed of a glass plate or a polymer material, more preferably formed of a polymer material from a viewpoint of easiness of bending, and particularly preferably formed of a resin film formed of a polymer material.

The resin film is preferable because the resin film has high heat resistance and can withstand vapor deposition for forming a scintillator layer. Among the resin films, polyimide has particularly excellent heat resistance and is suitable for forming columnar crystals on a support using a phosphor material by a vapor phase deposition method.

The support has a thickness usually of 1 to 1,000 μm, preferably of 10 to 500 μm, more preferably of 10 to 200 μm. If the thickness of the support is within the above range, even when a material such as glass or metal having a high elastic modulus is used for bonding a planar light receiving element to a scintillator panel, bending can be performed effectively in accordance with a film thickness distribution of a scintillator layer, and the planar light receiving element can be bonded to the scintillator layer such that a distance therebetween via an optical coupling layer is uniform in a plane. An auxiliary substrate formed of glass or a polymer is desirably disposed on a surface of the support having no scintillator disposed thereon via an adhesive layer from viewpoints of warpage control, stress dispersion, and moisture proofing. Note that the thickness of the auxiliary substrate is desirably 500 μm or less from a viewpoint of weight reduction. Note that a material formed of a known adhesive member and being similar to the optical coupling layer can be used as the adhesive layer.

Reflection Layer 11

It is also possible to dispose a reflection layer between the support and the scintillator layer, if necessary. By disposing the reflection layer, light emission of the phosphor can be taken out very efficiently, and therefore luminance is largely improved.

For example, the reflection layer can be formed of a material containing one or more elements of aluminum, silver, platinum, palladium, gold, copper, iron, nickel, chromium, cobalt, and stainless steel, or an alloy thereof. However, silver, aluminum, or an alloy containing silver or aluminum as a main component is preferable from a viewpoint of high reflectance. Two or more metal film layers as described above may be formed. In a case where two or more metal film layers are formed, the lower layer preferably contains nickel (Ni), chromium (Cr), or both Ni and Cr from a viewpoint of improving adhesiveness to the support. In addition, a layer formed of a metal oxide such as silica ($SiO_2$) or titanium dioxide ($TiO_2$) may be disposed on the metal film in this order to further improve the reflectance. Examples of a method for forming the metal layer on the support include deposition, sputtering, and bonding a metal foil without any particularly limitation. However, sputtering is most preferable from a viewpoint of adhesiveness.

Meanwhile, the reflection layer may be formed of light scattering particles and a binder resin.

The light scattering particles are not particularly limited as long as being a particulate material having a refractive index different from that of the binder resin constituting the reflection layer. Examples of the material include alumina, yttrium oxide, zirconium oxide, titanium dioxide, barium sulfate, silica, zinc oxide, calcium carbonate, glass, and a resin. These compounds may be used singly or in mixture of two or more kinds thereof. Among these compounds, titanium dioxide is particularly preferable from viewpoints of availability and high refractive index.

The titanium dioxide may have any crystal structure of a rutile type, a brookite type, and an anatase type. However, the rutile type is particularly preferable from viewpoints of a large ratio with the refractive index of the binder resin, achievement of high luminance, the reflectance of visible light, and the like.

The light scattering particles have an area average particle diameter preferably of 0.1 to 5.0 μm, more preferably of 0.2 to 3.0 μm from a viewpoint of reflectance. The titanium dioxide is particularly preferably surface-treated with an oxide of aluminum (Al), silicon (Si), zirconium (Zr), zinc (Zn), or the like in order to improve affinity and dispersibility with the binder resin or to suppress deterioration of the binder resin.

The light scattering particles are contained preferably in an amount of 3 to 90% by volume, more preferably in an amount of 10 to 50% by volume in 100% by volume of the total volume of components constituting the reflection layer. If the light scattering particles are contained in the reflection layer within such a range, not only the reflectance of the reflection layer and the sensitivity of the scintillator panel in which the scintillator layer is formed on the support are improved, but also adhesiveness between the reflection layer and the support or the scintillator layer is improved. Therefore, the reflection layer is not peeled off even if cutting is performed, and productivity can be enhanced.

Examples of the binder resin that can be used for the reflection layer include a polyurethane resin, a vinyl chloride copolymer, a vinyl chloride/vinyl acetate copolymer, a vinyl chloride/vinylidene chloride copolymer, a vinyl chloride/acrylonitrile copolymer, a butadiene/acrylonitrile copolymer, a polyamide resin, polyvinyl butyral, a polyester resin, a cellulose derivative (nitrocellulose or the like), a styrene/butadiene copolymer, various synthetic rubber-based resins, a phenol resin, an epoxy resin, a urea resin, a melamine resin, a phenoxy resin, a silicone resin, an acrylic resin, and a urea formamide resin. Among these resins, a hydrophobic resin such as a polyester resin, a polyurethane resin, or an acrylic resin is preferable from a viewpoint of excellent film-forming property to the columnar crystals of and the support of a phosphor formed by vapor deposition.

In order to improve adhesiveness between the support and the reflection layer, an intermediate layer may be disposed between the support and the reflection layer. The intermediate layer preferably contains a resin such as polyurethane, polyester, or a vinyl chloride-based copolymer.

Optical Coupling Layer 13

The optical coupling layer is a layer for bonding the scintillator panel to the planar light receiving element. In the present invention, the optical coupling layer is in direct contact with the columnar crystals constituting the scintillator layer. In this manner, if the optical coupling layer is in direct contact with the scintillator layer, the sharpness of the radiation image detection panel can be improved. Incidentally, in a case where the optical coupling layer is not in direct contact with the scintillator layer, light emitted from the scintillator layer diffuses before reaching the planar light receiving element, and image quality may be degraded.

A material constituting the optical coupling layer has a storage elastic modulus preferably of $1 \times 10^7$ Pa or more, more preferably of $2 \times 10^7$ Pa or more at 0 to 40° C. Within this range, deformation of the adhesive hardly occurs against change in temperature such as external temperature. Therefore, it is possible to effectively suppress occurrence of image unevenness, particularly mesh-shaped image unevenness.

The "storage elastic modulus at 0 to 40° C." in the present invention means that the storage elastic modulus within a temperature range of 0 to 40° C. falls within the above range although some resins change the storage elastic modulus thereof largely and some resins do not change the storage elastic modulus thereof. Therefore, the storage elastic modulus as defined in the present invention is not an average value between 0 and 40° C. but is a minimum value. The storage elastic modulus is measured using a dynamic viscoelasticity measuring device (RSA III manufactured by TA instruments) under measuring conditions of a temperature rising condition of −50 to 70° C., a temperature rising rate of 5° C./min, strain of 1%, and a frequency of 1 Hz.

The optical coupling layer needs to be transparent to an emission wavelength of the scintillator layer such that light emitted from the scintillator layer by irradiation with radiation can efficiently reach the planar light receiving element via the optical coupling layer. Specifically, the optical coupling layer has a transmittance usually of 70% or more, preferably of 80% or more, more preferably of 90% or more with respect to the emission wavelength of the scintillator layer.

In the present invention, the penetration depth of the adhesive between the columnar crystals of the phosphor is 1 to 125 μm, and preferably 20 to 50 μm. However, the penetration depth does not become larger than the thickness of the columnar crystals. Incidentally, as illustrated in FIG. 1, the penetration depth is a depth from an interface between the columnar crystals and the optical coupling layer, that is, from a tip of the columnar crystals to a base of the columnar crystals toward the support side. When the penetration depth is within this range, adhesiveness with the columnar crystals of the phosphor can be secured. The optical coupling layer and the scintillator are preferably bonded to each other closely without containing air bubbles or the like therebetween. Such penetration hardly causes deterioration of sharpness.

A material constituting the optical coupling layer is not particularly limited as long as having the above storage elastic modulus and may be an organic material mainly containing a thermoplastic resin or a thermosetting resin or an inorganic material such as silica or alumina Among these materials, a material formed of a thermoplastic resin mainly containing an olefin-based resin, an amide-based resin, an ester-based resin, a styrene-based resin, an acrylic resin, a urethane-based resin, a vinyl-based resin, a polycarbonate, or an ABS resin is preferable. Incidentally, the main component may contain other components as long as exhibiting a sufficient function and is contained usually in an amount of 50% by mass or more, preferably in an amount of 75% by mass or more, more preferably in an amount of 100% by mass.

An optical coupling layer according to an embodiment of the present invention is a hot-melt sheet. Here, the hot-melt sheet means a sheet containing no water or solvent, being solid at room temperature, and obtained by molding an adhesive resin (hot-melt resin) formed of a nonvolatile thermoplastic material into a sheet shape. The hot-melt sheet can bond adherends to each other by inserting the hot-melt sheet between the adherends, then melting the hot-melt sheet at a temperature equal to or higher than a melting point thereof, and lowering the temperature to a temperature equal to or lower than the melting point again to solidify the hot-melt sheet.

The hot-melt sheet contains no water or solvent. Therefore, even if the hot-melt sheet is brought into contact with a deliquescent scintillator layer like a scintillator layer, for example, formed of CsI(Na) or CsI(Tl), the scintillator layer does not cause deliquescence. Therefore, the hot-melt sheet is suitable for bonding the scintillator panel to the planar light receiving element.

In addition, the hot-melt sheet does not contain a residual volatile substance or the like. After the scintillator panel is bonded to the planar light receiving element, even if the hot-melt sheet is dried, shrinkage of the optical coupling layer is small, and dimensional stability thereof is excellent.

When the scintillator panel is bonded to the planar light receiving element using the hot-melt sheet, it is necessary for the hot-melt sheet to melt at an appropriate temperature and not to melt in a market environment.

The optical coupling layer may be formed of one kind of thermoplastic resin. However, according to one of preferable embodiments, the optical coupling layer may be a composite resin containing two or more kinds of thermoplastic resins having different storage elastic moduli. Incidentally, in a case where two or more kinds of thermoplastic resins are contained, the storage elastic modulus can be actually measured but can also be calculated from an amount ratio. A difference in minimum value of storage elastic modulus between two kinds of thermoplastic resins contained in the optical coupling layer at 0 to 40° C. (in a case of three or more kinds, combination of resins having the smallest difference in storage elastic modulus) is $1 \times 10$ Pa or more, and preferably $5 \times 10$ Pa or more. Within this range, the storage elastic modulus of the composite resin is higher.

The optical coupling layer may be a single layer containing a composite resin that is a mixture of two or more kinds of thermoplastic resins or a laminate of two or more optical coupling layers. The two or more optical coupling layers may be formed of thermoplastic resins having different storage elastic moduli. In a case where the optical coupling layer is a laminate formed of two or more thermoplastic resin layers, an average value of minimum values of the storage elastic modulus is taken as a storage elastic modulus.

The optical coupling layer has a film thickness preferably of 1 to 100 μm, more preferably of 5 to 50 μm. If the film thickness is within this range, adhesiveness between the scintillator panel and the planar light receiving element can be secured, diffusion of light emitted in the scintillator layer inside the adhesive layer is suppressed, and an image with high sharpness can be obtained.

The refractive index of the optical coupling layer according to an embodiment of the present invention is desirably between the refractive index of a material in contact with the optical coupling layer, that is, the scintillator and the refractive index of a material constituting an outermost layer of the planar light receiving element, or is desirably equal to at least one of these two refractive indices from a viewpoint of suppressing an optical loss at an interface.

The optical coupling layer may contain a filler. By including the filler, it is possible to improve the elastic modulus of the optical coupling layer, and to suppress occurrence of deformation and unevenness of the resin due to temperature fluctuation. As the filler, either an inorganic filler or an organic filler can be used. Examples of the filler include an inorganic filler such as alumina, yttrium oxide, zirconium oxide, titanium dioxide, barium sulfate, silica, zinc oxide, calcium carbonate, or glass and an organic filler formed of a polymer material such as polyurethane, polyacryl, polystyrene, polysilicone, or polyamide. These compounds may be used singly or in mixture of two or more kinds thereof.

Among the above particles, titanium dioxide having a particularly high refractive index is preferable. The particles have an area average particle diameter preferably of 1 to 50 nm, more preferably of 1 to 20 nm in order to prevent transparency of the optical coupling layer from being significantly impaired. However, the area average particle diameter is not larger than the thickness of the optical coupling layer. The filler is contained preferably in an amount of 3 to 30% by volume, more preferably in an amount of 5 to 20% by volume if the amount of all the materials constituting the optical coupling layer is assumed to be 100% by volume. By including the above particles within such a range, it is possible to improve the refractive index without significantly impairing transparency of the optical coupling layer.

Planar Light Receiving Element 14

As the planar light receiving element, a conventionally known planar light receiving element can be used without particular limitation.

The planar light receiving element has a configuration in which a plurality of light receiving elements is two-dimensionally arranged, for example, like a thin film transistor (TFT) active matrix substrate (hereinafter, referred to as "TFT substrate") in which a TFT and a storage capacitor are formed on an insulating substrate. Specifically, the TFT substrate is incorporated in AeroDR (manufactured by Konica Minolta, Inc.), PaxScan (FPD: 2520 manufactured by Varian Co., Ltd.), and the like.

In addition, as the planar light receiving element, an image sensor such as CCD or CMOS may be used.

[Radiation Image Detection Device]

The radiation image detection device includes the radiation image detection panel and a housing covering the radiation image detection panel.

The radiation image detection panel includes a scintillator layer, an optical coupling layer, and a planar light receiving element in this order, and is manufactured by bonding the radiation image detection panel to the planar light receiving element under heating at 50 to 150° C., preferably at 60 to 120° C. such that a distance between the scintillator layer and the planar light receiving element via the optical coupling layer is uniform.

The radiation image detection panel is preferably bonded to the planar light receiving element under a pressure of 10,000 to 1,000,000 Pa, preferably 100,000 to 500,000 Pa in addition to the above-described heating condition.

As a result, the planar light receiving element can be bonded to the scintillator layer via an optical coupling layer having a predetermined storage elastic modulus, and a radiation image detection device exhibiting good sharpness and suppressing occurrence of image unevenness can be provided.

EXAMPLES

Hereinafter, an embodiment of the present invention will be described in detail with reference to Examples but is not limited thereto.

(Manufacture of Scintillator Layer)

A polyimide support having a thickness of 75 μm (dimension: 430 mm×430 mm) was coated with a polyester resin layer containing titanium oxide to obtain a vapor deposition substrate. Subsequently, a phosphor material (CsI(Tl) (0.3 mol %)) was vapor-deposited to form a scintillator layer formed of columnar crystals.

When the film thickness of the scintillator layer reached 500 μm, the vapor deposition was terminated.

(Manufacture of Optical Coupling Layer)

The following adhesives were prepared.

Adhesive (1)

A KuranBeter (thickness: 30 µm) which is a film-shaped adhesive formed of an olefin-based resin, manufactured by Kurabo Industries Ltd., was used. A maximum value of the storage elastic modulus of the adhesive (1) is $1.4 \times 10^7$ Pa, and a minimum value thereof is $4.8 \times 10^6$ Pa at 0 to 40° C.

The adhesive (1) was inserted between the scintillator layer and the planar light receiving element, an optical coupling layer was formed by heating at 100° C. and pressurization at 200,000 Pa, and the scintillator layer was bonded to the planar light receiving element.

Adhesive (2)

A film-shaped adhesive (2) (thermally adhesive sheet manufactured by Dexerials Corporation: thickness 30 µm) mainly containing a composite resin containing two kinds of resins, an olefin-based resin and a vinyl-based resin, was used. A maximum value of the storage elastic modulus of the adhesive (2) was $9.7 \times 10^7$ Pa, and a minimum value thereof was $2.1 \times 10^7$ Pa at 0 to 40° C. A difference in storage elastic modulus between the two resins constituting the adhesive (2) was $1 \times 10^2$ Pa.

The scintillator layer was bonded to the planar light receiving element under the same conditions as the adhesive (1).

Adhesive (3)

A film-shaped Acrylite (thickness 30 µm) formed of an acrylic resin, manufactured by Mitsubishi Chemical Corporation, was used. A maximum value of the storage elastic modulus was $6.9 \times 10^8$ Pa, and a minimum value thereof was $6.1 \times 10^8$ Pa at 0 to 40° C.

The scintillator layer was bonded to the planar light receiving element under the same conditions as the adhesive (1).

Adhesive (4)

A composite resin containing 5 parts by mass of calcium carbonate having an average particle diameter of 5 µm as a filler in 100 parts by mass of the adhesive (2) was used.

Ae maximum value of the storage elastic modulus was $3.8 \times 10^8$ Pa, and a minimum value thereof was $6.3 \times 10^7$ Pa at 0 to 40° C. A difference in storage elastic modulus between the resins was $1 \times 10^2$ Pa.

The thermoplastic resin was melted at 200° C., and then a hot-melt sheet having a film thickness of 30 µm was manufactured using an extrusion coater to obtain an adhesive (4).

The scintillator layer was bonded to the planar light receiving element under the same conditions as the adhesive (1).

Examples 1 to 7 and Comparative Example 1

(Manufacture of Radiation Image Detection Device)

The scintillator layer was bonded to a planar light receiving element of AeroDR (FPD manufactured by Konica Minolta, Inc.) via each of the above adhesives (1) to (4) such that the optical coupling layer had the configuration in Table 1. Note that bonding was performed by heating at 75° C. for 15 minutes under a pressure of 100 kPa.

[Evaluation of Scintillator Panel]

Penetration Depth into Columnar Crystals

The penetration depth of the optical coupling layer into the columnar crystals was evaluated by observing the cross section of the scintillator layer using an optical microscope (upright microscope BX51M manufactured by OLYMPUS Corporation) and measuring a length from the tip of the columnar crystals to a depth where penetration of the optical coupling layer could be confirmed.

Image Unevenness

In evaluation of image unevenness, a temperature cycle of raising the temperature from −20° C. to 50° C. and then lowering the temperature to −20° C. was performed ten times, images before and after temperature cycle with an X-ray with a tube voltage of 80 kVp were observed, and whether image unevenness occurred was judged based on the following evaluation criteria.

⊚: Image unevenness did not occur at all
○: Image unevenness hardly occurred
×: Image unevenness occurred

MTF

A radiation incident surface side of the FPD was irradiated with an X-ray with a tube voltage of 80 kVp through a lead MTF chart, and image data was detected and recorded on a hard disk. Thereafter, the record on the hard disk was analyzed by a computer, and an MTF (MTF value at one spatial frequency cycle/mm) of an X-ray image recorded on the hard disk was used as an index of sharpness. The higher the MTF value is, the better the sharpness is. The MTF value was evaluated at the center of the radiation detection panel. Characteristics of the scintillator panel largely depend on the film thickness of the scintillator. Therefore, relative evaluation was made by assuming that a value of Comparative Example 1 was 1.00.

Adhesiveness

Adhesiveness of the optical coupling layer was evaluated by peeling strength when peeling was performed at a speed of 10 mm/min using a 90° peeling tester (P-90-200N manufactured by IMADA Co., Ltd.). An evaluation index of adhesiveness is as follows.

1: 0.1 kgf or less (adhesion does not occur)
2: 0.1 to 0.2 kgf
3: 0.2 to 0.4 kgf
4: 0.4 to 1.0 kgf (not peeled off due to temperature fluctuation)
5: 1.0 kgf or more

TABLE 1

| | Adhesive | Elastic modulus of optical coupling layer (0 to 40° C.) | | Resin (main component) | The number of resins contained | Difference in storage elastic modulus between two resins (0 to 40° C.) | Filler | Penetration amount between columnar crystals [µm] | Uneven-ness | MTF (With respect to Comparative Example 1) | Adhesive-ness |
|---|---|---|---|---|---|---|---|---|---|---|---|
| | | Maximum value [Pa] | Minimum value [Pa] | | | | | | | | |
| Comparative Example 1 | Adhesive (1) | $1.4 \times 10^7$ | $4.8 \times 10^6$ | Olefin-based resin | 1 | — | Not contained | 70 | X | 1.00 | 4 |
| Example 1 | Adhesive (2) | $9.7 \times 10^7$ | $2.1 \times 10^7$ | Olefin-based resin | 2 | $1 \times 10^2$ | Not contained | 30 | ○ | 1.14 | 4 |

TABLE 1-continued

| | Adhesive | Elastic modulus of optical coupling layer (0 to 40° C.) | | Resin (main component) | The number of resins contained | Difference in storage elastic modulus between two resins (0 to 40° C.) | Filler | Penetration amount between columnar crystals [μm] | Uneven-ness | MTF (With respect to Comparative Example 1) | Adhesive-ness |
|---|---|---|---|---|---|---|---|---|---|---|---|
| | | Maximum value [Pa] | Minimum value [Pa] | | | | | | | | |
| Example 2 | | | | | | | Not contained | 1 | ○ | 1.20 | 2 |
| Example 3 | | | | | | | Not contained | 5 | ⊙ | 1.20 | 4 |
| Example 4 | | | | | | | Not contained | 100 | ⊙ | 1.00 | 5 |
| Example 5 | | | | | | | Not contained | 125 | ○ | 1.00 | 5 |
| Example 6 | Adhesive (3) | $6.9 \times 10^6$ | $6.1 \times 10^6$ | Acrylic resin | 1 | — | Not contained | 20 | ○ | 1.14 | 4 |
| Example 7 | Adhesive (4) | $3.8 \times 10^8$ | $6.3 \times 10^7$ | Olefin-based resin | 2 | $1 \times 10^2$ | Contained | 30 | ○ | 1.12 | 4 |

Although embodiments of the present invention have been described and illustrated in detail, the disclosed embodiments are made for purposes of illustration and example only and not limitation. The scope of the present invention should be interpreted by terms of the appended claims.

What is claimed is:

1. A radiation image detection panel comprising: a scintillator layer formed of columnar crystals; an optical coupling layer; and a planar light receiving element, wherein a material constituting the optical coupling layer has a storage elastic modulus of $1 \times 10^7$ Pa or more at 0 to 40° C.

2. The radiation image detection panel according to claim 1, wherein the optical coupling layer penetrates between columnar crystals of the scintillator, and a penetration depth thereof is 1 to 125 μm.

3. The radiation image detection panel according to claim 1, wherein a material constituting the optical coupling layer contains a thermoplastic resin.

4. The radiation image detection panel according to claim 3, wherein as the thermoplastic resin, at least one thermoplastic resin selected from the group consisting of an olefin-based resin, an amide-based resin, an ester-based resin, a styrene-based resin, an acrylic resin, a urethane-based resin, a vinyl-based resin, a polycarbonate, and an ABS resin is mainly contained.

5. The radiation image detection panel according to claim 4, wherein the optical coupling layer is a composite resin containing two or more kinds of thermoplastic resins having different storage elastic moduli.

6. The radiation image detection panel according to claim 5, wherein a difference in storage elastic modulus between two kinds of thermoplastic resins contained in the optical coupling layer at 0 to 40° C. (in a case of three or more kinds, combination of resins having the smallest difference in storage elastic modulus) is $1 \times 10$ Pa or more.

7. The radiation image detection panel according to claim 1, wherein the optical coupling layer has a film thickness of 1 to 100 μm.

8. The radiation image detection panel according to claim 1, wherein the optical coupling layer further contains a filler.

9. A radiation detection device comprising: the radiation image detection panel according to claim 1; and a housing that covers the radiation image detection panel.

* * * * *